United States Patent
Oh

[19]

[11] Patent Number: 6,125,020
[45] Date of Patent: Sep. 26, 2000

[54] COMPRESSOR PROTECTIVE DEVICE FOR REFRIGERATOR AND METHOD OF PROTECTING REFRIGERATOR COMPRESSOR

[75] Inventor: Chi-Seong Oh, Kwangju, Rep. of Korea

[73] Assignee: SamSung Electronics Co., Ltd., Suwon, Rep. of Korea

[21] Appl. No.: 09/235,484

[22] Filed: Jan. 22, 1999

[51] Int. Cl.[7] .................................................. H02H 7/00
[52] U.S. Cl. ........................ 361/22; 361/91.2; 361/91.3
[58] Field of Search ................................ 361/22, 23, 28, 361/33, 91.1, 91.2, 91.3; 62/129, 158

[56] References Cited

U.S. PATENT DOCUMENTS

| | | | |
|---|---|---|---|
| 3,583,173 | 6/1971 | Chesebro | 62/158 |
| 4,912,936 | 4/1990 | Denpou | 62/158 |
| 5,493,868 | 2/1996 | Kikuiri et al. | 62/129 |

*Primary Examiner*—Michael J. Sherry
*Attorney, Agent, or Firm*—Robert E. Bushnell, Esq.

[57] ABSTRACT

A compressor protective device for a refrigerator including a voltage sensor detecting a voltage applied to a compressor through a shunt resistor; a voltage amplifier amplifying a voltage signal from the voltage sensor; a voltage converter converting the voltage signal, amplified by the voltage amplifier, into a voltage of absolute value; and a controller producing a high signal or low signal in response to the voltage signal out of the voltage converter to control a turn-on or turn-off operation of the compressor, a method of protecting a compressor for a refrigerator having a voltage sensor and a controller, including the steps of determining whether or not the compressor is turned on and an error flag is set; it the error flag is set, determining whether or not an output voltage of the voltage sensor is higher than a reference voltage; if the voltage of the voltage sensor is higher than the reference voltage, determining that an overvoltage is applied to the compressor, and increasing error data in the controller by one to determine if the increased error data is higher than a given value; and if the increased error data is higher than the value, stopping the operation of the compressor.

9 Claims, 2 Drawing Sheets

COMPRESSOR PROTECTIVE DEVICE FOR REFRIGERATOR AND METHOD OF PROTECTING REFRIGERATOR COMPRESSOR

BACKGROUND OF THE INVENTION

1. Field of the Invention

The present invention generally relates to a protective device for a compressor. More particularly, it relates to a compressor protective device for a refrigerator that senses an abnormal state of a refrigerator compressor such as an overvoltage or an overload during operation; and delays the turned-off operation of the compressor for a predetermined period of time to prevent the compressor from being turned on or turned off frequently at the near threshold value, thereby more stably operating the compressor.

2. Description of the Related Art

A compressor is a device that compresses a refrigerant in a gaseous state by rotation of a rotor or reciprocation of a piston, and is essentially employed for a refrigerator or an air conditioner. An overload or overvoltage that occurs in the compressor increasing the pressure of the refrigerant may cause damage to the compressor and decrease the life expectancy of the compressor. Thus a proper measure against an overload or overvoltage is required.

Japanese Patent Unexamined Publication No. hei 4-218801 is a related art, and concerns a power cutoff circuit for an air conditioner. This air conditioner, which applies a signal line power to a driving part turning on or turning off transistors of an inverting part when an AC (alternating current) voltage output from the inverting part is applied to a compressor motor, includes: a -reset part that produces a reset signal for resetting a micom (microcomputer) for a given period of time upon application of the power, and generates an inverted output of the reset signal; and a transistor circuit that is capable of stopping the application of the signal line power and releasing the cutoff by the inverted output of the reset signal, and carries out the cutoff of the signal line power at the time of resetting the microcomputer.

The above-mentioned Japanese Patent does not propose a specific method of protecting the compressor, and cuts-off the signal line power during reset by resetting the microcomputer after application of power in order to simply prevent damage to the components at the time of the application of power. This patent does not disclose a method of controlling the turn-on/turn-off operation of the compressor by sensing an abnormal state such as an overvoltage or overload during operation.

In the meantime, the compressor of the above related art employs a mechanical overload protective device for cutting off the overload or overvoltage. This mechanical overload protective device senses that the electric power is increased as the pressure of a water pipe within the compressor is lowered when the overload or overvoltage occurs to thereby detect the overload, and cuts off the voltage, which takes time and causes damage to the compressor.

SUMMARY OF THE INVENTION

Accordingly, the present invention is directed to a compressor protective device for a refrigerator and a method of protecting the refrigerator compressor that substantially obviate the problems due to limitations and disadvantages of the related art.

It is an object of the present invention to provide a compressor protective device for a refrigerator that senses an abnormal state of a refrigerator compressor such as an overvoltage, which may be due to an overload, during operation, and delays the turn-off operation of the compressor for a predetermined period of time to prevent the compressor from being turned on or turned off frequently neat the threshold value, thereby more stably operating the compressor.

It is another object of the present invention to provide a method for protecting a compressor of a refrigerator by sensing an abnormal state of a refrigerator compressor such as an overvoltage and delaying the turn-off operation of the compressor for a predetermined period of time to prevent the compressor from being turned on or turned off frequently near the threshold value, thereby more stably operating the compressor.

In order to obtain the above-mentioned objectives of the present invention, there is disclosed a compressor protective device for a refrigerator including a voltage sensor detecting a voltage applied to a compressor through a shunt resistor; a voltage amplifier amplifying a voltage signal from the voltage sensor; a voltage converter converting the voltage signal, amplified by the voltage amplifier, into a voltage of absolute (positive) value; and a controller producing a high signal or low signal, in response to the voltage signal output by of the voltage converter, to control a turn-on or turn-off operation of the compressor.

According to another aspect of the present invention, there is a method for protecting a compressor of a refrigerator having a voltage sensor detecting a voltage applied to the compressor, and a controller receiving an output voltage of the voltage sensor to determine whether there is an overvoltage of the compressor, which may be due to an overload, having the steps of determining whether or not the compressor is turned on and whether or not an error flag is set; if the error flag is set, determining whether or not the output voltage of the voltage sensor is higher than a reference voltage; if the output voltage of the voltage sensor is higher than the reference voltage, determining that an overvoltage is applied to the compressor and increasing error data in the controller by one to determine if the increased error data is higher than a given value; and if the increased error data is higher than the given value, stopping the operation of the compressor.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
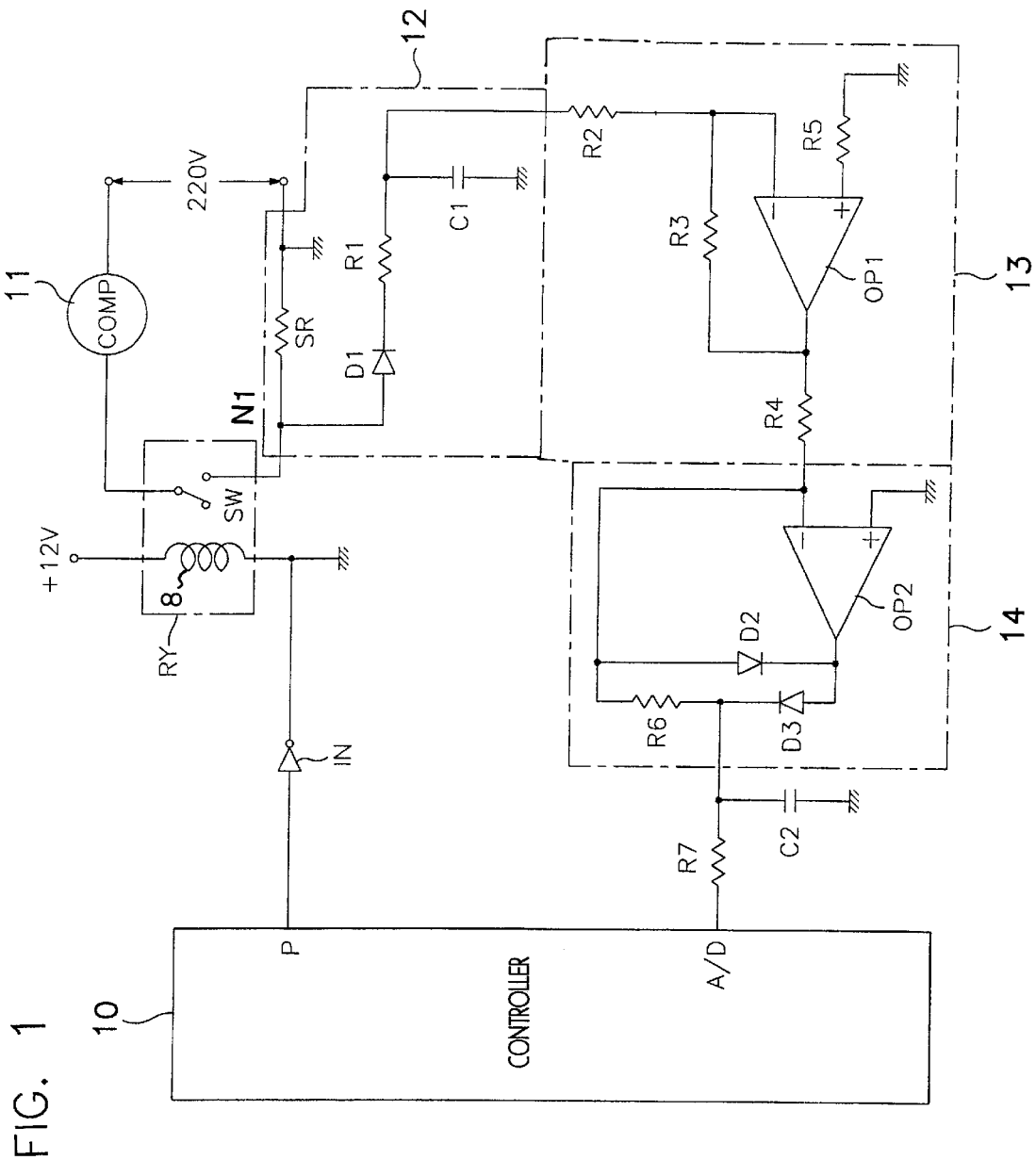
FIG. 1 is a circuit diagram of a compressor protective device for a refrigerator in accordance with the present invention.
Figure 2:
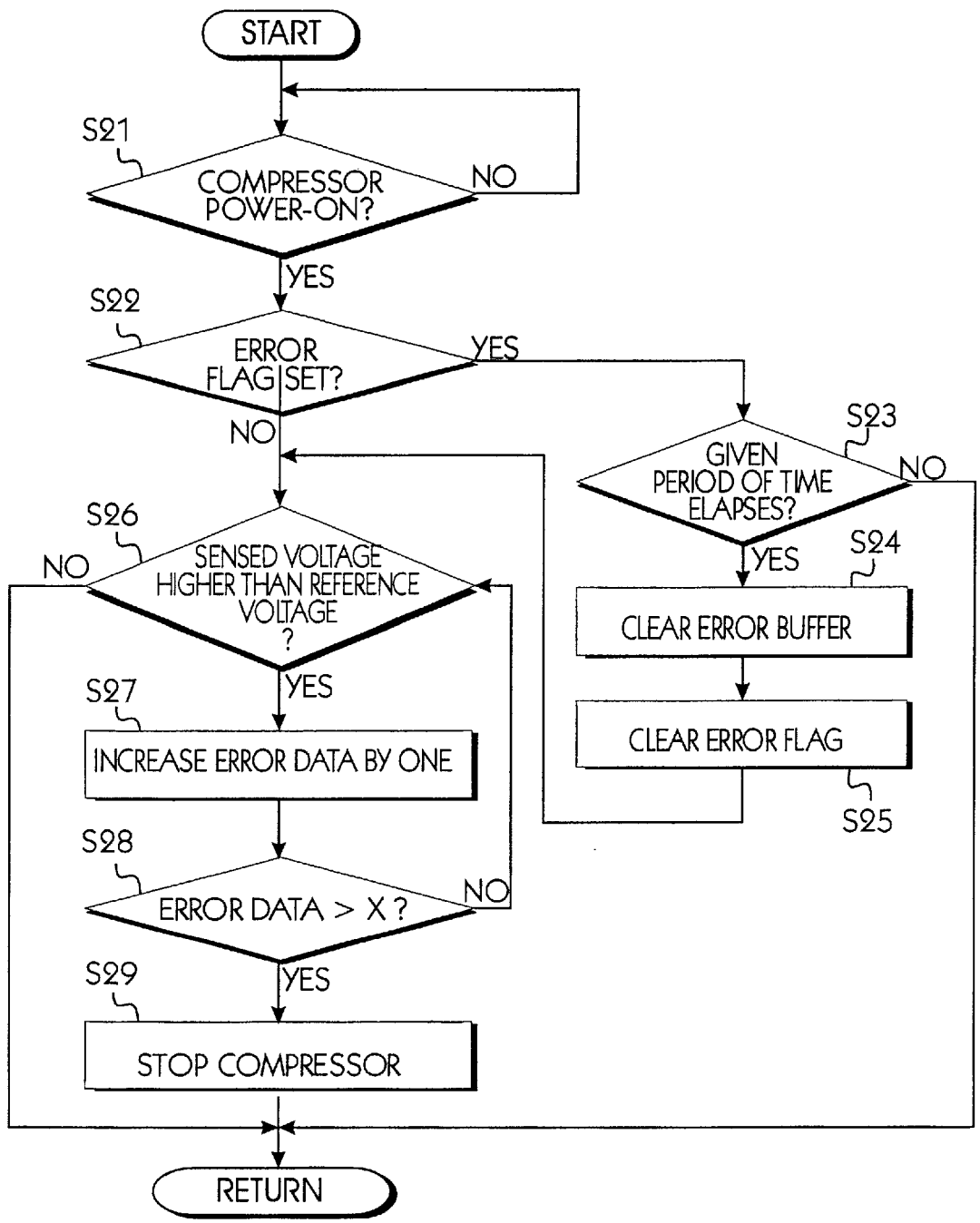
FIG. 2 shows the control sequence of protecting the refrigerator compressor in accordance with the present invention.

FIG. 1 is a circuit diagram of a compressor protective device for a refrigerator in accordance with the present invention, and FIG. 2 depicts the control sequence of protecting the refrigerator compressor in accordance with the present invention.

As shown in FIG. 1, the compressor protective device of the present invention includes a controller 10 that produces, via an output terminal P, a high signal, i.e., logic high, "1", to turn on a compressor 11 or a low signal, i.e., logic low, "0", to turn off compressor 11; a relay RY having a coil 8 connected between a 12V DC (direct current) voltage source and a ground terminal and a switch SW, wherein relay RY is connected to output terminal P of controller 10 via an inverter IN such that switch SW of relay RY applies driving power of 220 volts to compressor 11 or cuts off the driving power according to the level of the signal output from output terminal P; a voltage sensor 12 that senses the voltage applied to compressor 11; a voltage amplifier 13 which amplifies a voltage signal output from the voltage sensor 12 and outputs an amplified voltage signal; and a voltage converter 14 that converts the amplified voltage signal output from voltage amplifier 13 into a voltage of absolute value.

Voltage sensor 12 includes a shunt resistor SR having one end connected to the ground terminal of a voltage source and another end connected at a node N1 which is also connected to one terminal of switch SW of relay RY; a diode D1 having a first terminal (anode) connected to node N1 and a second terminal (cathode) connected to one end of a resistors R1; and a capacitor C1 is connected between another end of resistor R1, at a node N2, and a ground terminal.

The voltage amplifier 13 includes an operational amplifier OP1 having a inverting terminal connected to a node N3 and a non-inverting terminal connected to a ground terminal via a resistor R5; a resistor R2 has one end connected to node N2 and another end connected to node N3 and a resistor R3 connected between node N3 and an output terminal of operational amplifier OP1 for controlling the amplification factor; and a resistor R4 connected between the output terminal of operational amplifier OP1 and voltage converter 14.

Voltage converter 14 includes an operational amplifier OP2 having an inverting terminal connected to resistor R4 and a non-inverting terminal connected to the ground terminal, a diode D2 having a first terminal (anode) connected to the inverting terminal of operational amplifier OP2 and a second terminal (cathode) connected to the output terminal of operational amplifier OP2, a diode D3 having a first terminal (anode) connected to the output terminal of operational amplifier OP2 and a second terminal (cathode) connected to a node N4; and a resistor R6 connected between the first terminal of diode D2 and node N4. Voltage converter 14 converts the amplified output voltage of voltage amplifier 13 to an absolute (positive) value by rectification.

A resistor R7 is connected between node N4 and an input terminal A/D of the controller 10. A capacitor C2 is connected between node N4 and the ground terminal. Resistor R7 and capacitor C2 smooth the output voltage of voltage converter 14.

In the compressor protective device of the present invention the controller 10 produces a high signal during normal operation, and the output high signal is inverted to a low signal through the inverter IN to turn on a switch SW of the relay RY. When relay RY is turned on, the power is applied to compressor 11, thus driving compressor 11. When compressor 11 is driven, the voltage applied to compressor 11 through shunt resistor SR can be detected. The voltage of a given level, detected through shunt resistor SR of voltage sensor 12, is applied via diode D1, resistor R1 and resistor R2 to the inverting terminal of operational amplifier OP1 of voltage amplifier 13. Voltage amplifier 13 receives the output voltage of voltage sensor 12, and operational amplifier OP1 amplifies the output voltage of voltage sensor 12 according to the amplification factor of the resistor R3.

The voltage amplified through operational amplifier OP1 of the voltage amplifier 13 is amplified again through operational amplifier OP2 of voltage converter 14, and is rectified and converted to a voltage of absolute value through diodes D2 and D3 and resistor R6. This voltage of absolute value is smoothed through the capacitor C2 and resistor R7 and then applied to input terminal A/D of controller 10. The voltage, applied to input terminal A/D of the controller 10, is converted to a digital signal, and an internal comparator (not shown) monitors whether or not the voltage applied to compressor 11 is an overvoltage due to an overload. If the comparator determines it as an overvoltage, it sets an error flag in an error buffer (not shown).

The following description relates to a method of controlling the compressor 11. Referring to the flow chart of FIG. 2, controller 10 monitors, at step S21, whether or not compressor 11 is turned on, and determines, at step S22, whether the error flag is set in the error buffer.

When controller 10 determines that the error flag is set at step S22, it monitors, at step S23, whether or not a given period of time elapses to prevent the overall system from becoming unstable by compressor 11, which is frequently turned on or turned off at the settling time when the output voltage of the voltage sensor 12 swings near the reference voltage, and clears, at steps S24 and S25, the error buffer and the error flag in controller 10.

When it is determined in step S22 that the error flag is not set in the error buffer or following step S25 controller 10 determines, in step S26, whether the voltage applied to input terminal A/D is higher than a reference voltage for determining the overload of compressor 11. When controller 10 determines, at step S26, that the voltage applied to its input terminal A/D is not higher than the reference voltage it returns to step S21.

When controller 10 determines, at step S26, that the voltage applied to input terminal A/D is higher than the reference voltage, it increases, at step S27, data of the error buffer in controller 10 by one, and monitors, at step S28, whether or not the increased data of the error buffer is larger than a predetermined value X. When controller 10 determines that the increased data of the error buffer is smaller than the value X at step S28, it returns to step S26 and compares the voltage, which is continuously applied to input terminal A/D, with the reference voltage.

When controller 10 determines that the increased data of the error buffer is larger than the value X at step S28, it produces a low signal through the output terminal P, and this low signal is converted to a high signal by the inverter IN to turn off the operation of relay RY, thus stopping, at step S29, compressor 11. After that, controller 10 sets the error flag and returns to S21. The reason why compressor 11 is turned off only when the data of the error buffer is larger than the value X at step S28 is to determine that the enough of an overvoltage is created to turn off compressor 11 immediately at S29, and when the data of the error buffer is not increased to a level greater than the predetermined value X, compressor 11 can continue to operate satisfactorily, so the operating efficiency of the compressor 11 is maintained without stopping compressor 11. It should be understood that the compressor is turned on in step S21 after an elapse of a predetermined time period.

As described above, the; present invention monitors the abnormal state such as overvoltage, which may be due to an overload, during operation of the compressor, and assures more stable operation of the compressor by delaying the turned-off operation of the compressor for a predetermined period of time to prevent the compressor from being turned on or turned off frequently when the sensed voltage nears the threshold value. Accordingly, the present invention controls the turned-on or turned-off operation of the compressor by checking a load applied to the operating compressor, thus providing protection to the compressor against overload.

What is claimed is:

1. A compressor protective device for protecting a compressor of a refrigerator, said compressor protective device comprising:

a voltage sensor outputting a sensed voltage signal by detecting a voltage applied to the compressor through a shunt resistor;

a voltage amplifier for outputting an amplified voltage signal by amplifying the sensed voltage signal output from the voltage sensor;

a voltage converter converting the amplified voltage signal into a voltage of absolute value; and a controller producing one of a logic high signal and a logic low signal in response to the voltage of absolute value output from the voltage converter to control a turn-on or turn-off operation of the compressor.

2. The compressor protective device as set forth in claim 1, wherein said controller produces said logic low signal to turn off the compressor when the output voltage signal from the voltage converter is higher than a reference voltage.

3. The compressor protective device as set forth in claim 1, further comprising:

a relay having a coil connected between a direct current voltage source and a ground terminal, and a switch connected between said shunt resistor and said compressor, said switch being activated in response to a direct current voltage applied to said coil from said direct current voltage source; and an inverter connected between an output terminal of said controller and said ground terminal connected to said coil, said controller producing either said logic high signal or said logic low signal from said output terminal.

4. The compressor protective device as set forth in claim 1, wherein said voltage sensor comprises said shunt resistor and further comprises:

a diode having a first terminal connected to said shunt resistor at a first node;

a resistor connected between a second terminal of said diode and a second node, said second node being connected to output said sensed voltage to said voltage amplifier; and a capacitor connected between said second node and a ground terminal.

5. The compressor protective device as set forth in claim 1, wherein said voltage amplifier is an inverting amplifier comprising:

a first resistor having one end connected to receive said sensed voltage output from said voltage sensor and another end connected to a node;

an operational amplifier having an inverting terminal connected to said node, a non-inverting connected to a ground terminal via a second resistor and an output terminal;

a third resistor connected between said node and said output terminal of said operational amplifier; and a fourth resistor connected between said output terminal of said operation amplifier and said voltage converter to provide said amplified voltage signal to said voltage converter.

6. The compressor protective device as set forth in claim 1, wherein said voltage converter comprises:

an operational amplifier having a non-inverting terminal connected to a ground terminal, an inverting terminal connected to receive said amplified voltage signal output from said voltage amplifier, and an output terminal;

a first diode connected between said inverting terminal and said output terminal of said operational amplifier;

a second diode connected between said output terminal of said operational amplifier and a node; and a resistor connected between said inverting terminal and said output terminal of said operational amplifier and said node, said node being further connected to provide said voltage of absolute value to said controller.

7. The compressor protective device as set forth in claim 6, further comprising smoothing means connected between said node and said controller, said smoothing means comprising:

a resistor connected between said node and an analog-to-digital converting input terminal of said controller, said controller converting said voltage of absolute value to a digital signal for comparison to a reference value and produces one of said logic high signal and said logic low signal as a result of said comparison; and a capacitor connected between said node and said ground terminal.

8. A method of protecting a compressor of a refrigerator having a voltage sensor detecting a voltage applied to the compressor, and a controller receiving an output voltage of the voltage sensor to determine an overvoltage of the compressor, the method comprising the steps of:

determining whether or not the compressor is turned on;

determining whether an error flag is set in an error buffer of said controller when it is determined that said compressor is turned on;

determining whether or not the output voltage of the voltage sensor is higher than a reference voltage when it is determined that the error flag is not set;

increasing error data in the error buffer of said controller by one when it is determined that said output voltage of the voltage sensor is higher than said reference voltage;

determining whether or not said error data has a value greater than a predetermined value after increasing said error data by one;

returning to said step of determining whether or not the output voltage of the voltage sensor is higher than the reference voltage, when it is determined that said error data does not have a value greater than said predetermined value; and turning off said compressor when it is determined that said error data has a value greater than said predetermined value.

9. The method as set forth in claim 8, further comprising the steps of:

checking whether or not a given period of time has elapsed, when it is determined that said error flag is set in said error buffer;

returning to said step of determining whether or not the compressor is turned on, when it is checked that said given period of time has not elapsed; and clearing the error flag and the error data from said error buffer, when it is checked that said given period of time has elapsed and returning to said step of determining whether or not the output voltage of the voltage sensor is higher than the reference voltage.

* * * * *